United States Patent [19]
Wakimura et al.

[11] Patent Number: 5,110,575
[45] Date of Patent: May 5, 1992

[54] PROCESS FOR PRODUCING SINTERABLE CRYSTALLINE ALUMINUM NITRIDE POWDER

[75] Inventors: Kazuo Wakimura, Sennan; Masao Tanaka, Sakai; Atsuhiko Hiai, Takaishi, all of Japan

[73] Assignee: Mitsui Toatsu Chemicals, Inc., Tokyo, Japan

[21] Appl. No.: 708,807

[22] Filed: May 31, 1991

Related U.S. Application Data

[63] Continuation of Ser. No. 470,458, Jan. 29, 1990, abandoned.

[30] Foreign Application Priority Data

| Jan. 27, 1989 | [JP] | Japan | 1-16244 |
| Feb. 16, 1989 | [JP] | Japan | 1-48998 |
| Mar. 9, 1989 | [JP] | Japan | 1-55070 |
| Jun. 21, 1989 | [JP] | Japan | 1-156705 |

[51] Int. Cl.$^5$ .......................... C01B 21/072
[52] U.S. Cl. ........................ 423/412; 501/96
[58] Field of Search ............................... 423/412

[56] References Cited

U.S. PATENT DOCUMENTS

| 4,783,430 | 11/1988 | Su | 501/96 |
| 4,869,925 | 9/1989 | Hiai et al. | 423/412 |

FOREIGN PATENT DOCUMENTS

| 100004 | 5/1988 | Japan | 423/412 |
| 176302 | 7/1988 | Japan | 423/412 |

OTHER PUBLICATIONS

Interrante et al., "Studies of Organometallic Precursors to Aluminum Nitride", paper presented at Better Ceramics Through Chemistry II Symposium held Apr. 15-19, 1986, Palo Alto. CA, pp. 359-366.

Interrante et al., Chem. Abstracts, vol. 106 (15), 652 (13 Apr. 1987).

Patent Abstracts of Japan, vol. 12 (279) (1 Aug. 1988); JP-A-63 60 102.

Patent Abstracts of Japan, vol. 12 (450) (25 Nov. 1988); JP-A-63 176 302.

Patent Abstract of Japan, vol. 13 (249) (9 Jun. 1989); JP-A-1 56 308.

*Primary Examiner*—Wayne A. Langel
*Attorney, Agent, or Firm*—Millen, White & Zelano

[57] ABSTRACT

Sinterable crystalline aluminum nitride powder is produced by reacting alkyl aluminum with ammonia in a gas phase to produce an amorphous aluminum nitride presursor powder, and subjecting the precursor powder to a primary calcination in a reducing gas containing at least 20% (vol.) ammonia at 600° C. to 1300° C., and then subjecting the calcined aluminum nitride to a secondary calination in an inert gas or a reducing gas at 1400°-1750° C.

12 Claims, 2 Drawing Sheets

PROCESS FOR PRODUCING SINTERABLE CRYSTALLINE ALUMINUM NITRIDE POWDER

This application is a continuation of application Ser. No. 07/470 458, filed Jan. 29, 1990, abandoned.

BACKGROUND OF THE INVENTION

1. Field of the Invention

The present invention relates to a process for producing a sinterable crystalline aluminum nitride powder, and more particularly, to a process for producing aluminum nitride powder containing an amount of impurities low enough that it can be used for producing aluminum nitride substrates for semiconductors and the like.

2. Description of the Prior Art

In the field of microelectronics, large scale integration and high output are recently more and more in demand and, therefore, conventional alumina substrates have become unsatisfactory as a heat releasing substrate for such semiconductor devices.

As a result, an aluminum nitride substrate draws attention as a new heat releasing substrate because of its high thermal conductivity, high heat resistance and high insulating properties.

In connection with the foregoing situation, there are various known processes for producing an aluminum nitride powder. They are, for example, (1) a process comprising heating metallic aluminum in a nitrogen or ammonia atmosphere, (2) a process comprising mixing alumina powder and carbon powder and heating the mixture in a nitrogen or ammonia atmosphere, (3) a process comprising applying a heat treatment to a reaction product of organic aluminum and amines, and (4) a process comprising reacting ammonia with aluminum chloride or aluminum bromide gas or a mixture gas thereof in a vapor phase.

However, these processes have drawbacks. With respect to process (1), since the melting point of aluminum is near to the nitriding temperature, the product solidifies or a highly pure product can not be obtained because impurities in the starting material can not be removed. With respect to process (2), the particle size of the alumina starting material and the impurities therein are brought into the product without change so that highly pure starting materials of a uniform particle size are required. With respect to process (3), a lot of residual carbon remains in the product and its removal is difficult. As for process (4), the by-product, a hydrogen halide gas, disadvantageously corrodes the apparatus and the waste gas treatment and the like are also problems.

A new process for producing crystallized aluminum nitride has been recently proposed which comprises mixing an alkyl aluminum and ammonia at a molar ratio of flow rate of ammonia gas to alkyl aluminum of at least 5 at a temperature not higher than 200° C. and carrying out the vapor reaction at 600°–1300° C. to produce amorphous aluminum nitride powder followed by calcining at 1400° C. or higher for crystallization thereof (Japanese Patent Application Laid-open Sho 63-60102). This process is carried out by a vapor phase reaction and therefore advantageously gives a powder with less aggregation and a relatively good sintering property as compared with a liquid phase reaction. However, as a result of the present inventor's investigation, the following problems arise when using this process for an industrial production.

Firstly, when ammonia gas and alkyl aluminum are mixed at a temperature not higher than 200° C., the resulting complex does not reach the decomposition temperature and a white sticky matter is formed which clogs nozzles and reactor pipes. In other words, if the reacting gases are mixed under these conditions, such clogging makes long run continuous operation difficult. If both starting materials are mixed at a higher temperature, self-decomposition of alkyl aluminum causes clogging of the feed line to a significant extent. Further, although the amorphous powder is calcined at a temperature not lower than 1400° C. for crystallization thereof, it is particularly difficult in large scale industrial production to reduce the carbon content in the product to less than 0.1%. The reason for this is not completely clear, but it appears that on scaling up, the reaction does not occur uniformly due to turbulence of the gas stream in the reactor pipe and as a result the residual carbon content in the amorphous powder increases.

A method for synthesizing aluminum nitride by a vapor phase reaction of organic aluminum compounds with ammonia gas is reported, for example, by Manasevit et al., Journal of the Electrochemical Society, Vol. 118, No. 11, pp. 1864–1868 (1971), in which trimethyl aluminum and ammonia are reacted in a vapor phase to grow aluminum nitride crystals on a heated substrate. However, the carbon content of the aluminum nitride thus obtained is as high as 1% by weight and the purpose is not the production of aluminum nitride powder, but vapor-deposition thereof on a substrate.

In general, as disclosed, for example, in Yogyo Kyokai—shi, Vol. 12, p. 95, 1987, it is preferable that both the oxygen and carbon contents of aluminum nitride powder used as fine ceramics raw materials are low. Although the sintering property is degraded when oxygen is not present in the powder at all, nevertheless, in general the oxygen content is preferably less than 1% by weight, more preferably less than 0.6% by weight and the carbon content is preferably less than 0.5%, more preferably less than 0.1% by weight. (Hereinafter, oxygen and carbon contents are in terms of % by weight unless otherwise noted.)

With respect to particle size, the aluminum nitride powder is preferably a fine powder having a particle size of not larger than $0.1\mu$. However, the smaller the particle size, the larger the surface activity, and therefore, it is difficult to lower the oxygen content to less than 1% due to the adsorbed oxygen even if the powder is handled as carefully as possible in an inert gas.

In any event, the aluminum nitride powder produced by the above-mentioned methods contains a fairly large amount of oxygen and carbon as impurities in differing proportions depending upon the reaction mode and crystallization conditions. Therefore, the sintered body prepared from the aluminum nitride powder does not have sufficiently high heat resistance, high insulating property, in particular, high thermal conductivity and in addition, a method for removing the impurities is not yet available and its development is needed.

SUMMARY OF THE INVENTION

An object of the present invention is to provide a process for producing an aluminum nitride powder of a uniform and small particle size, low oxygen and carbon contents, good crystallinity and high purity.

Another object of the present invention is to provide a process for producing an aluminum nitride powder stably and with a high reproducibility on an industrial scale.

A further object of the present invention is to provide a process for producing an aluminum nitride powder continuously on an industrial scale.

Still another object of the present invention is to provide a substantially oxygen-free at least about 99.9% pure aluminum nitride powder which is capable of being sintered at a low temperature.

According to one aspect of the present invention, there is provided a process for producing sinterable crystalline aluminum nitride powder which comprises reacting alkyl aluminum with ammonia in a gas phase at 600°-1400° C. to produce an amorphous aluminum nitride precursor powder and then calcining the aluminum nitride precursor powder in two stages, the first in an atmosphere of a reducing gas containing at least 20% by volume of ammonia at 600°-1300° C. as a primary calcination, and the second in a non-reactive atmosphere, preferably in a stream of an inert gas or a reducing gas, at 1400°-1750° C. as a secondary calcination.

According to another aspect, there is provided a substantially oxygen-free, at least about 99.9% pure crystalline aluminum nitride powder which can be sintered at 1800°-2000° C., produced according to the process of this invention.

According to another aspect, there is provided a sintered body produced by sintering aluminum nitride powder produced according to the process of this invention.

According another aspect of the present invention, there is provided a sintered body produced by the aluminum nitride powder prepared by the above-mentioned process.

DESCRIPTION OF THE PREFERRED EMBODIMENTS

As the alkyl aluminum used in the present invention, there are preferably used a trialkyl aluminum or a dialkyl aluminum halide, preferably of 1-6 carbon atoms in each alkyl group, e.g., trimethyl aluminum, triethyl aluminum, triisobutyl aluminum, dimethyl aluminum halide, diethyl aluminum halide, diisobutyl aluminum halide and the like. Triethyl aluminum, triisopropyl aluminum and triisobutyl aluminum are commercially produced by mass production are advantageous from an economical point of view and, in particular, triethyl aluminum is preferable.

Alkyl aluminum is fed to a reactor in a vapor phase. If it is fed in a liquid phase, the stability of the reactor is intermittently disturbed by the latent heat of vaporization of the said compounds and therefore the particle sizes of the aluminum nitride thus produced disadvantageously become nonuniform.

As a method of feeding alkyl aluminum to the reaction zone in the form of vapor phase, the alkyl aluminum can be heated and fed as a vapor or a non-oxidizing gas (or inert gas) such as nitrogen, hydrogen, helium, argon and the like, or a mixture thereof can be bubbled into a vessel containing the alkyl aluminum to form an alkyl aluminum-saturated vapor in which the above-mentioned gas is a carrier gas, and the saturated vapor is then fed to the reaction zone.

It is preferable that the temperature of the contents of the alkyl aluminum vessel is minutely and variably controlled in response to the amount of the carrier gas introduced into and the amount of alkyl aluminum to be fed from the vessel. For example, the amount of carrier gas introduced is kept constant and the amount of alkyl aluminum to be fed is controlled by varying the temperature inside of the alkyl aluminum vessel, which is preferably 120°-170° C. In this manner, the alkyl aluminum and ammonia gas fed to a reactor produce an aluminum nitride precursor in the reactor in the form of fume.

The process of forming particles in a vapor phase reaction starts from the formation of nuclei by chemical reactions among the starting materials and then initial particles are formed. It is assumed that, at the stage of growth of the particles, the fine particles are floating and colliding with each other, which results in the aggregation thereof. In an actual process, these phenomena occur simultaneously and incidentally in disorder and therefore this is a very complicated process. In this way, it is assumed that the concentration of the gaseous starting materials in the reaction system and the ratio of the reaction components largely affect the aggregation state of the precursor powder obtained by the vapor phase reaction. In addition, the physical properties of the precursor particles are largely correlated with the physical properties of the final aluminum nitride sintered body.

In the reaction system for producing the precursor, the molar ratio of alkyl aluminum to ammonia fed thereto is preferably 1:1 to 1:100. If the molar ratio of ammonia to alkyl aluminum is less than 1, the alkyl aluminum is subjected to self-decomposition at the reaction zone and aluminum nitride precursors containing metallic aluminum as impurity are disadvantageously formed. In contradistinction, if the molar ratio of ammonia to alkyl aluminum exceeds 100, the shapes of the thus-produced particles fluctuate to a great extent and apparently buoyant and very bulky aggregated pulverulent bodies are produced. In addition, at such a high molar ratio the production efficiency per unit volume of a reactor is lowered and ammonia consumption is so large that the operation is not economical.

In the present invention, the phrase "whole gas in the system" means all the gases present in a reactor, which are alkyl aluminum gas, ammonia gas, carrier gases for supplying alkyl aluminum in the form of gas, purge gases for preventing the pulverulent body produced in the reactor from attaching to the reactor wall, non-oxidizing gases (inert gases) such as the above-mentioned nitrogen, hydrogen, helium, argon and the like, which are used as a dilluting gas for controlling the linear velocity of the gas in the reactor or the like. The concentration of alkyl aluminum based on the whole gas in the system is preferably 0.01-0.2 in terms of volume ratio. If the volume ratio of alkyl aluminum to the whole gas in the system is less than 0.01, the resulting particle size is in the range of a super fine particle so that, upon further crystallizing the resulting amorphous reaction products at a higher temperature, there occurs abnormal particle growth resulting in aggregation. The density of the sintered body obtained by using such aluminum nitride powder is low and a high thermal conductivity can not be obtained.

If the volume ratio exceeds 0.2, self-decomposition of the alkyl aluminum occurs to produce particles containing metallic aluminum as an impurity.

Moreover, if the operation is conducted outside the above-mentioned range, an aluminum nitride precursor which can be converted into a sintered body exhibiting a good thermal conductivity can not be produced.

Thus, it is preferable that the alkyl aluminum, in admixture with a non-reactive gas (non-oxidizing) such as nitrogen or the like, and the ammonia are fed to a reactor as separate gaseous streams, where they are mixed and react at about 600°–1400° C., to produce an aluminum nitride precursor as a fume-like product.

Figure 1:
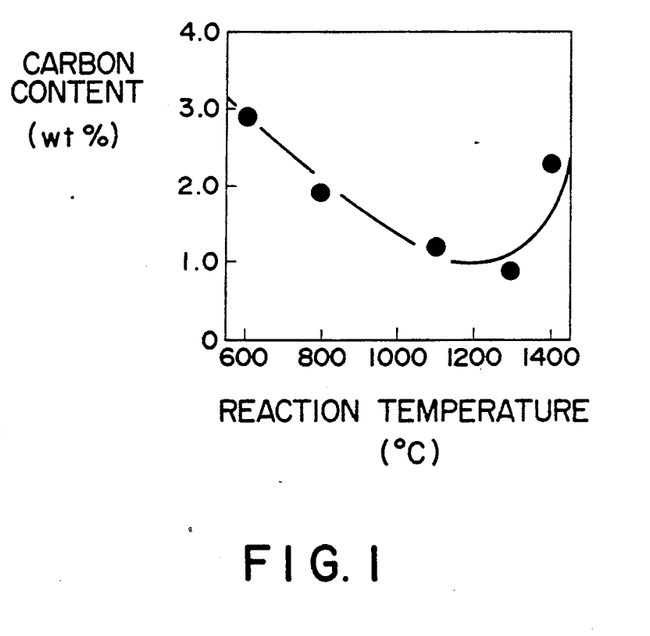
FIG. 1 represents the relationship between the primary calcining temperature used to prepare an aluminum nitride precursor powder and the carbon content thereof.

The precursor thus produced contains a large amount of carbon originating from the alkyl aluminum. The carbon content depends on the reaction conditions, such as the reaction temperature in the reactor, residence time and the like, but as shown in FIG. 1, the products obtained at a reaction temperature of 600°–1400° C. contain several % of carbon. Usually, the powder thus produced does not consist completely of aluminum nitride crystals when examined by X-ray diffraction but instead also contains amorphous components.

The powder is so unstable to a reactive gas such as oxygen and the like that it is preferably handled in an inert gas atmosphere which is strictly controlled.

Since the precess for producing aluminum nitride according to the present invention does not use starting materials containing oxygen, oxygen originating from the starting materials can theoretically be substantially zero in the powder product, provided the handling thereof is carefully effected as discussed above.

The amorphous aluminum nitride precursor powder thus produced is subsequently calcined at a temperature of 600°–1300° C. in a reducing gas atmosphere containing at least 20% by volume (hereinafter called "primary calcination"). In the primary calcination, decarbonization is mainly effected.

As the reducing gas, there may be mentioned hydrogen, lower hydrocarbons such as methane, ethane, propane, butane and the like. A reducing gas comprising ammonia, preferably ammonia diluted with hydrogen and most preferably, one containing at least 20% by volume of ammonia, is preferred.

In the primary calcination, when the concentration of ammonia in the reducing gas is less than 20% by volume, the effect is not entirely obtained and the calcination requires a long time to go to completion and is thus industrially disadvantageous.

Instead of diluting ammonia with a reducing gas, substantially 100% ammonia, i.e. pure ammonia, may be used.

During calcination in the above-mentioned gas atmosphere, a flow rate of the gas per gram of material to be calcined (the precursor powder) is preferably not lower than about 0.1 l./hr. and not higher than about 10 l./hr., more preferably not higher than 3 l./hr. When the flow rate is substantially lower than this range, the decarbonization of the material to be calcined is markedly lowered and, moreover, the carbon isolated by decarbonization remains in a large amount in the furnace. When the flow rate is substantially higher than this range, the gas is consumed wastefully and further the heat efficiency of the calcination furnace is lowered and is not economical.

After the temperature is raised to a selected temperature, calcination is carried out for about 30 min.–10 hours, preferably for about 1 hour–3 hours to decarbonize sufficiently. The primary calcination temperature is 600°–1300° C., preferably 900°–1200° C. When the calcination temperature is lower than 600° C., the decarbonizing reaction rate is disadvantageously lowered and when the calcination temperature exceeds 1300° C., decomposition of the ammonia in the gas occurs sufficiently to make it difficult for ammonia to be present in the calcination atmosphere at a concentration higher than 20% by volume. Therefore, preferably the calcination temperature is a temperature which is lower than the decomposition temperature of ammonia gas and at which the decarbonization reaction can be efficiently conducted, that is, 900°–1200° C.

The decarbonized aluminum nitride powder thus primarily calcined is not sufficiently crystalline, and is therefore further calcined at 1400°–1750° C., preferably 1500°–1700° C. to sufficiently crystallize (hereinafter called "secondary calcination"). To prevent decomposition, the secondary calcination is conducted in a non-reactive atmosphere, e.g., in a stream of an inert gas or a reducing gas.

The term "Inert gas" means a gas which does not substantially react with the primary calcined product when contacting therewith. Nitrogen is preferred as the inert gas from the standpoints of economy and availability.

The secondary calcination may be effected in succession in the same furnace where the primary calcination has been effected, or the primary calcined product may be first cooled, e.g., to room temperature, and then calcined in another furnace. In the furnace atmosphere of the secondary calcination it is not required that ammonia gas be present. It is only necessary that the atmosphere is non-reactive. This is preferably accomplished by the use of the above-mentioned inert gas or a reducing gas in a flow system as in the primary calcination and the calcination is conducted by passing such a gas through the furnace usually at a rate of at least 0.1 l./hr. and not higher than 10 l./hr., preferably not higher than 3 l./hr. About 30 min.–10 hours, preferably 1–3 hours, after reaching the secondary calcination temperature are sufficient for the calcination. If the calcination temperature is lower than 1500° C., in particular, lower than 1400° C., a sufficient crystallization can not be expected. Ammonia gas may be used as a flowing gas. At such a temperature it is decomposed into nitrogen and hydrogen and behaves as a mixture of nitrogen and hydrogen. The secondary calcination can be carried out under vacuum.

The secondary calcination does not cause a change due to chemical reaction between the aluminum nitride powder and the atmosphere gas, but a physical, crystallographical change occurs due to heating energy.

It is preferred that a series of operations according to the present invention are carried out under an atmosphere strictly controlled such that oxygen does not enter during handling of the powder.

Figure 2:
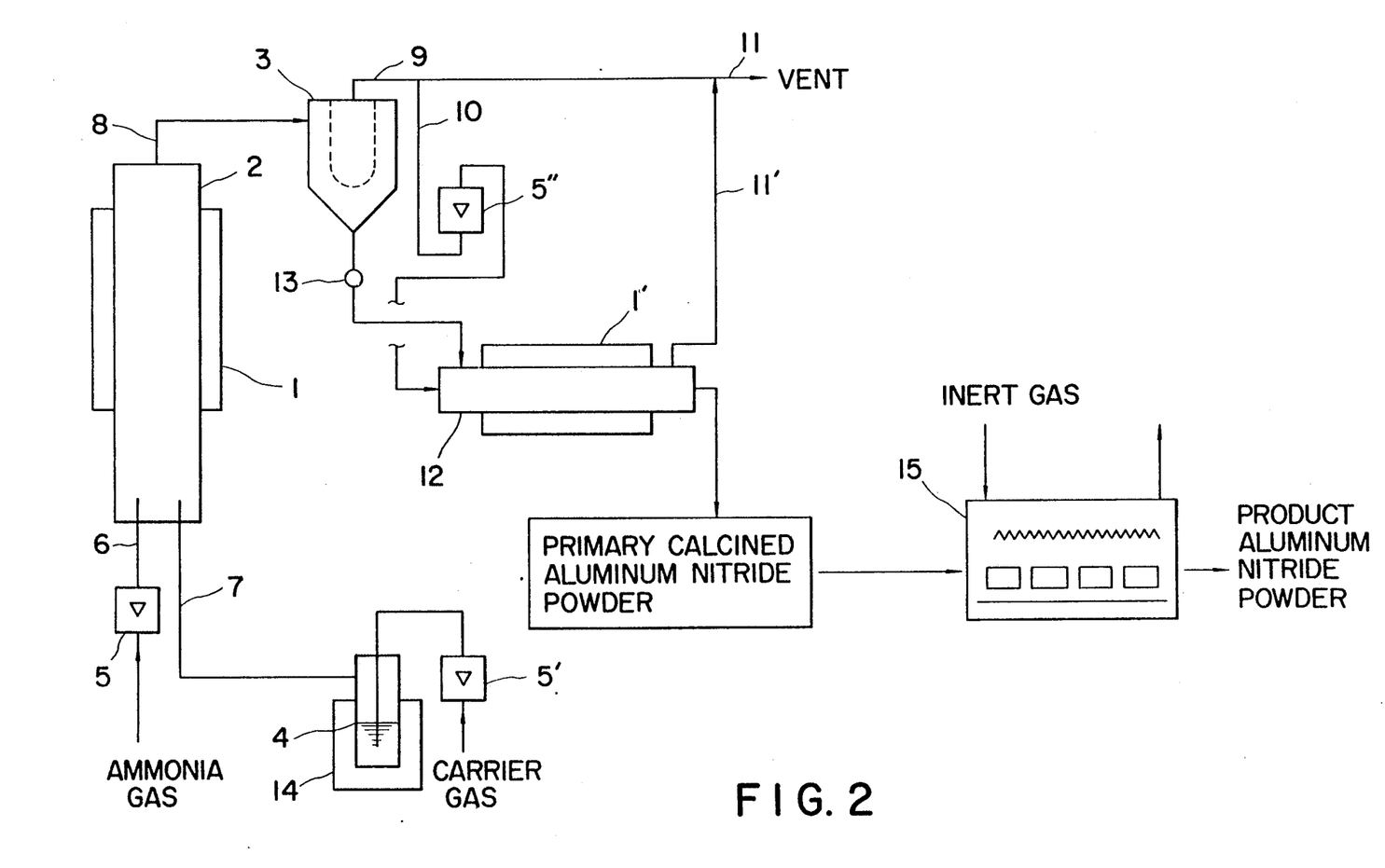
FIG. 2 is a flow sheet showing an example of a process for producing aluminum nitride according to the present invention.

The process of the present invention is preferably carried out following the flow sheet as shown in FIG. 2, each of 5,5' and 5" denotes a flow meter, 8 a reactor outlet line, 9 a filter outlet line, 11' a vent gas line and 1' a heating means for primary calcination furnace 12.

To reactor 2 of an empty vertical-column type tubular reactor which is kept at a selected calcining temperature by heating means 1 are fed ammonia gas and an alkyl aluminum preferably together with a non-oxidizing carrier gas, to effect the desired reaction. A supply of alkyl aluminum is kept at a selected temperature by heater 14. A carrier gas, such as nitrogen gas, is bubbled into vaporizer 4 to produce a gas stream saturated with alkyl aluminum. The resulting alkyl aluminum-saturated vapor is fed to reactor 2 through feeding line 7 while ammonia is fed to reactor 2 through feeding line 6. The flow rate of the ammonia and the carrier gas is regulated by metering valves 5 and 5', respectively.

The resulting fume-like aluminum nitride amorphous powder is introduced into a separating means such as filter 3 to separate the powder from the gas phase.

According to the present invention, it is preferable to use a two-fluid nozzle (not shown) for feeding the alkyl aluminum to the reactor 2. The two-fluid nozzle consists of a so-called double pipe which has an inner pipe and an outer pipe, and the mixture of alkyl aluminum and an inert gas which is the same as the above-mentioned carrier gas are fed through the inner pipe and the outer peripheral portion between the outer pipe and the inner pipe, respectively. At the opening end of the nozzle, the tip of the inner pipe is preferably situated at the same position as or slightly inside of the tip of the outer pipe such that the alkyl aluminum is covered by and diluted with the inert gas and fed to the reactor, whereby the mixing of the alkyl aluminum with the ammonia occurs beyond the opening end of the nozzle at about the reaction temperature, so that the powder thus produced is prevented from sticking to and clogging opening end of the feeding nozzle.

It is preferable that the alkyl aluminum after its abrupt contact with the ammonia at the opening end of the feeding nozzle has been avoided is immediately brought into intimate contact with the ammonia. If all of the alkyl aluminum is not immediately contacted with the ammonia, the alkyl aluminum is easily thermally decomposed, even though it is diluted with an inert gas, at the temperature in the reactor and consequently metallic aluminum is deposited in the system, which accelerates clogging at the feeding nozzle area.

The flow rate of inert gas fed from the outer pipe of the above-mentioned two-fluid nozzle is usually 2-50 times, preferably 5-10 times the flow rate of the alkyl aluminum vapor or the alkyl aluminum saturated-carrier gas. When the flow rate of inert gas is less, the dilution is insufficient and when the flow rate is higher, the resulting excess dilution lowers the volume production efficiency of the reactor.

The resulting aluminum nitride amorphous precursor powder, in the form of a fume, is introduced into separating means 3, for example, a beg filter, to separate the powder from the reactor vent gas.

The amorphous powder collected by filter 3 is quantitatively fed to primary calcination furnace 12 through rotary valve 13 provided at the lower portion of the filter case. A portion of the vent gas, which contains unreacted ammonia, is quantitatively fed in a selected amount determined by metering valve 5" to primary calcination furnace 12 as an atmosphere gas through vent gas branch line 10. The remaining ammonia-containing gas is discharged to the outside of the system through vent gas line 11.

Decarbonized aluminum nitride powder which has been subjected to the primary calcination in primary calcination furnace 12 is quantitatively discharged to the next step (secondary calcination).

The type of primary calcination furnace employed is not particularly limited, but a rotary kiln is preferable. When a rotary kiln is used, a grinding step can be omitted and the primary calcination can be carried out continuously. As the atmosphere gas in the kiln, there is preferably used a portion of the vent gas from which the powder has been separate and removed is fed through vent gas branch line 10. The amount of vent gas used is determined by the gas linear velocity in the rotary kiln, which is usually about 0.01–10 cm/sec. At a velocity slower, the decarbonizing effect is not sufficient whereas, at a faster velocity the powder in the kiln is blown out and as the amount of flying fine powder increases, the filter becomes clogged. By using a part of the vent gas, the reducing gas containing ammonia can be effectively utilized. From about 30–100% of the vent gas is used. If the amount of original vent gas is insufficient, a reducing gas containing new ammonia gas is used to make up the deficiency.

According to the present invention, the primary calcination conducted in a rotary kiln can produce continuously a powder of such good quality that a final grinding step can be omitted. The reason therefor is not completely clear, but is believed to be due to the effective prevention of aggregation of the powder during the calcination. The amorphous powder recovered from the reaction system is decarbonized during the primary calcination simultaneously with the growth of the particles and at this point aggregation of the particle is most apt to occur. It appears that the aggregation can be inhibited by moving the powder during primary calcination using a rotary kiln.

A major advantage of using a rotary kiln as a primary calcination furnace is that the reaction for producing the precursor powder and the primary calcination can be continuously carried out. That is, the active precursor powder thus prepared can be subjected to the calcination treatment without removing the precursor powder from the system and exposing it to air and water. The powder prepared by such a process according to the present invention is insignificantly contaminated by oxygen and it is theoretically possible that oxygen-free powder can be produced.

The calcining time employed in a rotary kiln affects the degree of decarbonization to a great extent. For the purpose of obtaining a sufficient degree of decarbonization, the treating time is usually about 1-10 hours, depending upon the kiln temperature. For example, when the treating temperature is 1000° C., the treating time is preferably about 2-5 hours.

The decarbonized primary calcined powder discharged from the first calcination furnace, for example rotary kiln 12, is not a completely crystallized powder, and is therefore fed to the second calcination furnace 15 (secondary calcination furnace) and crystallized. As the second calcination furnace 15, there may be used an electric furnace of the fixed bed type or the like.

The primary calcined powder is crystallized by a secondary calcination in the second calcination furnace 15 in a non-reactive, i.e., non-oxidizing, atmosphere at a temperature of 1400°–1750° C., preferably 1500°–1700° C., thereby producing a sufficiently crystallized aluminum nitride powder.

In this crystallization step, the secondary calcination can be carried out in a completely closed system by using a rotary kiln as the second calcination furnace and quantitatively feeding the primary calcined powder thereto by a rotary valve. This operation reduces the chance of contact of the powder with the air and thereby advantageously produces product with low oxygen content. Moreover, the primary calcined powder is far less active and, the standpoint of omitting the grinding step, the advantage of the present invention can be sufficiently attained.

The aluminum nitride crystalline powder thus obtained shows a complete aluminum nitride pattern according to X-ray diffraction analysis and is of a very high purity, i.e., the oxygen and carbon contents are not more than 1% by weight and not more than 0.1% by weight, respectively.

A sintered body made of an aluminum nitride powder produced by the present invention exhibits a very high thermal conductivity as high as 150-230 W/m. °K., which confirms that the aluminum nitride powder is of a very high purity and high quality.

The method employed for sintering the aluminum nitride powder is not particularly limited. For example, the following method may be employed.

The aluminum nitride powder and a sintering auxiliary agent such as yttria, calcia and the like are mixed. If necessary, a binder is also mixed therewith so as to improve shapeability. The amount of these auxiliary agents to be added is of the order of several %, preferably 1-5% based on the aluminum nitride powder. The mixing method may be a wet method using a solvent, such as alcohols and the like, or a dry method. The powder mixture thus obtained is molded and sintered at any selected temperature. The sintering is effected, in general, at a sintering temperature of 1700°-2200° C., preferably 1800°-2000° C., for about 1-5 hours. When the sintering is effected for a longer period of time, the physical properties are further improved but, except for a special end use usually such a long sintering time is not preferable since the industrial productivety is lowered.

Heretofore, aluminum nitride has been regarded as a compound capable of being sintered with difficulty only at a fairly high sintering temperature. Therefore, an aluminum nitride powder capable of sintering at a lower temperature has been in demand. Such a low temperature sintering aluminum nitride powder can be produced, according to the present invention. The temperature raising rate during the sintering is not particularly limited but, from an economical point of view, is usually about 300°-1000° C./hr. The atmosphere in a sintering furnace may be nitrogen, helium, argon and the like.

The following examples are given by way of illustration and not limitation of the present invention.

EXAMPLE 1

Using a reactor consisting of an empty column, triethyl aluminum and an ammonia gas (1:11, by volume) were caused to react at 800° C. to produce a milky-white aluminum nitride precursor powder having a carbon content of 2.2% by weight. The volume ratio of the triethyl aluminum to the whole reaction system including an inert gas was 0.05:1. The resulting powder (100 g) was removed from the reactor and placed in an alumina boat under a nitrogen atmosphere to charge it in an electric furnace.

Ammonia gas was passed through the furnace at a rate of 100 l./hr., first to completely replace the nitrogen by ammonia next while the temperature of the furnace was raised up to 1100° C. at a rate of 300° C./hr., then while the furnace was kept at that temperature for 3 hrs. and thereafter while lowering the temperature to room temperature. The resulting primary calcined product was a white powder (85 g). 10 g of the thus produced powder was removed as a sample and the remaining 75 g was again charged to an electric furnace and, while passing nitrogen gas at a flow rate of 75 l./hr. therethrough, the temperature was raised to 1650° C. at a rate of 300° C./hr. and then kept at that temperature for 3 hours to give a white crystalline aluminum nitride powder, a secondary calcined product.

Carbon contents of the primary and the secondary calcined products were 0.09% by weight and 0.08% by weight, respectively, and the oxygen content of the secondary calcined product was 0.66% by weight.

The primary and the secondary calcined products to which 3% by weight of yttria was added to each as a sintering auxiliary agent, were sintered at 1800° C. The primary calcined product could not be sintered and therefore the thermal conductivity thereof was not measured. In contradistinction, the secondary calcined product was a milky-white semitransparent sintered body whose thermal conductivity was 210 W/m. °K. The results are shown in Tables 1 and 2.

EXAMPLES 2-6 AND COMPARATIVE EXAMPLES 1-5

Using the aluminum nitride precursor powder obtained in Example 1 the procedures of Example 1 were repeated except that in the primary calcination the calcination atmosphere and the atmosphere gas flow rate were varied and the secondary calcination and the following steps were not conducted. The carbon contents of each of the resulting primary calcined product was measured. The result is shown in Table 1.

TABLE 1

| | Primary Calcination | | | | |
|---|---|---|---|---|---|
| | Atmosphere gas composition (vol. %) | | | Flow rate | Residual carbon |
| Example | NH₃ | H₂ | N₂ | l./hr. | % by weight |
| Example 1 | 100 | | | 100 | 0.09 |
| Example 2 | 100 | | | 10 | 0.10 |
| Example 3 | 100 | | | 200 | 0.08 |
| Example 4 | 50 | 50 | | 200 | 0.10 |
| Example 5 | 30 | 70 | | 200 | 0.10 |
| Example 6 | 20 | 80 | | 200 | 0.11 |
| Comparative Example 1 | 15 | 85 | | 200 | 1.33 |
| Comparative Example 2 | | 75 | 25 | 200 | 2.13 |
| Comparative Example 3 | 30 | 70 | | 5 | 1.89 |
| Comparative Example 4 | | 100 | | 200 | 2.42 |
| Comparative Example 5 | | 100 | | 200 | 2.45 |

EXAMPLES 7-11, COMPARATIVE EXAMPLES 6-7

Using the primary calcined product obtained in Example 1, the procedure of Example 1 was repeated except that calcination atmosphere and calcination temperature in the secondary calcination were changed. The thermal conductivity of the resulting sintered product was measured. The resust is shown in Table 2.

TABLE 2

| | Secondary Calcination | | |
|---|---|---|---|
| Example | Temperature (°C.) | Atmosphere gas | Thermal conductivity of Sintered Body (W/m. °K.) |
| Example 1 | 1650 | N₂ | 210 |
| Example 7 | 1500 | N₂ | 193 |
| Example 8 | 1600 | N₂ | 200 |
| Example 9 | 1700 | N₂ | 206 |

TABLE 2-continued

| | Secondary Calcination | | |
|---|---|---|---|
| Example | Temperature (°C.) | Atmosphere gas | Thermal conductivity of Sintered Body (W/m. °K.) |
| Example 10 | 1600 | NH$_3$ | 197 |
| Example 11 | 1600 | H$_2$ | 192 |
| Comparative Example 6 | 1400 | N$_2$ | 96 |
| Comparative Example 7 | 1300 | N$_2$ | not sintered |

EXAMPLE 12

Keeping at 800° C. an empty column reactor having an inner diameter of 60 mm and provided with an outer electric furnace, ammonia gas was fed at a rate of 400 g/hr. from the lower part of the reactor and nitrogen as a carrier gas was introduced at a rate of 100 l./hr. into an alkyl aluminum vessel containing triethyl aluminum to thereby feed triethyl aluminum at a rate of 300 g/hr. to the lower part of the reactor. The molar ratio of ammonia to triethyl aluminum was 8.95 and the volume ratio of triethyl aluminum to the whole gas in the system was 0.086:1.

The reaction product was an amorphous power which exhibited slightly a pattern of aluminum nitride when observed by X-ray diffraction. The amorphous aluminum nitride powder was heated at a rate of 300° C./hr., using a high temperature electric furnace of a batch type, and calcined at 1100° C. for 3 hours in an ammonia atmosphere (primary calcination). The resulting powder was then further heated at a rate of 300° C./hr. and calcined in a nitrogen atmosphere at 1600° C. for 3 hours (secondary calcination) resulting in crystallization. The crystalline powder thus obtained was milky-white and was crystalline aluminum nitride according to X-ray diffraction. Elementary analysis showed an Al content of 65.8% and an N content of 34.1%. (These values are substantially the same as the theoretical values of aluminum nitride.)

To the crystalline aluminum nitride was added 3% by weight of yttria as a sintering auxiliary agent and the mixture sintered at 1800° C. for 3 hours. As shown in Table 3, the thermal conductivity of the resulting sintered body was as good as 187 W/m. °K.

EXAMPLES 13–16, COMPARATIVE EXAMPLES 8–10

The procedure of Example 12 was repeating except that the introducing rate of the carrier gas into the alkyl aluminum vessel or the temperature of the vessel was changed to vary the feeding rate of triethyl aluminum. In each example, a sintered body was produced. The results are shown in Table 3.

EXAMPLE 17

The procedure of Example 12 was repeated except that 520 g of triisobutyl aluminum was used in place of triethyl aluminum. A sintered body was obtained. The results are shown in Table 3.

TABLE 3

| Example | Alkyl aluminum Type | Alkyl aluminum Feeding Rate (g./hr.) | Carrier gas Type | Carrier gas Introducing Rate (l./hr.) | Molar ratio of ammonia to alkyl aluminum | Volume ratio of alkyl aluminum to the whole gas in the system | Elementary composition of crystal (%) Al | Elementary composition of crystal (%) N | Thermal conductivity of sintered body (W/m. °K.) | Remarks |
|---|---|---|---|---|---|---|---|---|---|---|
| Example 12 | Triethyl aluminum | 300 | Nitrogen | 100 | 8.95 | 0.086 | 65.8 | 34.1 | 187 | |
| Comparative Example 8 | Triethyl aluminum | 25 | Nitrogen | 100 | 107.3 | 0.008 | 64.3 | 35.3 | 83 | |
| Example 13 | Triethyl aluminum | 50 | Nitrogen | 100 | 53.6 | 0.015 | 65.8 | 34.1 | 194 | |
| Example 14 | Triethyl aluminum | 100 | Nitrogen | 100 | 26.8 | 0.03 | 65.9 | 34.0 | 172 | |
| Example 15 | Triethyl aluminum | 500 | Nitrogen | 100 | 5.4 | 0.135 | 65.8 | 34.1 | 183 | |
| Example 16 | Triethyl aluminum | 1000 | Nitrogen | 500 | 2.7 | 0.16 | 65.9 | 34.2 | 168 | |
| Comparative Example 9 | Triethyl aluminum | 2500 | Nitrogen | 500 | 1.07 | 0.32 | 67.9 | 32.1 | 62 | *1 |
| Comparative Example 10 | Triethyl aluminum | 3000 | Nitrogen | 500 | 0.89 | 0.36 | — | — | — | *2 |
| Example 17 | Triisobutyl aluminum | 520 | Nitrogen | 100 | 8.95 | 0.086 | 65.7 | 34.2 | 177 | |

Remarks:
*1 The inside of the reactor was liable to be clogged and the continuous operation was not possible. Therefore, samples in an amount enough to evaluate the physical properties were collected and sintered.
*2 Since the beginning of the reaction, the pressure of the alkyl aluminum feeding pipe was liable to rise and the operation was stopped due to clogging of the feeding pipe.

EXAMPLE 18

To an empty column reactor of 8 cm in inner diameter and 2 m in length kept at 800° C. by an outer heating furnace were fed 660 g (38.8 moles) of ammonia per hour and 240 g (2.11 moles) of triethyl aluminum per hour using nitrogen gas as a carrier gas which produced reaction product in the form of fume, which was collected by a sintered metal filter made of SUS 316.

The collected powder was fed from a rotary valve of a pipe provided at the lower portion of the filter vessel to a rotary kiln of 6 cm in inner diameter at a rate of 87 g/hr, and the reactor vent gas from the filter was fed to the rotary kiln at a rate of 150 l./hr. for the primary calcination. The rotating speed of the rotary kiln was adjusted so as to calcine the powder at 1000° C. for 3 hours.

The primary calcined powder from the rotary kiln was substantially white and was discharged therefrom at a rate of 78 g/hr. 50 g of the powder was subjected to a secondary calcination at 1600° C. for 3 hours in a nitrogen atmosphere without being exposed to the air, resulting in crystallization of the powder. The weight of powder was not reduced by the calcination.

After the crystallization, the specific surface area of the powder according to BET method was 4.3 m$^2$/g, and oxygen and carbon contents thereof were 0.6% and 0.07%, respectively. The X-ray diffraction pattern of the powder was completely consistent with that of crystalline aluminum nitride. The yield of the resulting aluminum nitride was 90% based on triethyl aluminum.

To the aluminum nitride powder was added 3% yttria together with ethanol as a solvent to wet-mix followed by CIP (Cold Isostatic Press) shaping. The resulting shaped material had a density of 1.85. For comparison, the resulting crystalline powder was ground in a ball-mill containing balls made of aluminum nitride for 48 hours. The density of the shaped material produced by CIP shaping was 1.87. Thus, there was not any significant difference between the density value thereof and that of the above-mentioned shaped material which was not previously ground.

EXAMPLE 19

A primary calcined powder produced by the same method as in Example 18 was fed, at a rate of 78 g/hr., to a rotary kiln kept at 1600° C. by a heating furnace through a rotary valve, and the rotating speed of the kiln was controlled such that the residence time in the heating zone of 1600° C. was 3 hours.

The discharge rate of the crystallized aluminum nitride powder was 77 g/hr. The specific surface area of the powder was 4.5 m$^2$/g and the oxygen and carbon contents thereof were 0.3% and 0.06%, respectively. X-ray diffraction pattern of the resulting powder was completely consistent with that of aluminum nitride. The CIP shaped body of the powder had a density of 1.86. Grinding treatment was not required.

COMPARATIVE EXAMPLE 11

The procedure of Example 18 was repeated except that nitrogen gas was used as an atmosphere in the rotary kiln instead of the primary calcination reactor vent gas. The resulting primary calcined product was deep-black and the carbon content was 3.4%.

The powder was crystallized in a way similar to in Example 18. X-ray diffraction pattern of the resulting crystal was consistent with that of aluminum nitride, but the color was very poor.

EXAMPLE 20

A two-fluid nozzle composed of an outer pipe of 10 mm outside diameter and 8 mm inside diameter and an inner pipe made of stainless steel of 6 mm outside diameter and 4 mm inside diameter was filled with an ammonia feeding pipe in parallel at the bottom of a reactor.

Before starting the reaction, an ammonia atmosphere was created in the inside of the reactor, having an inside temperature at the feeding portion of 250° C., by feeding ammonia at a rate of 400 l./hr. while nitrogen gas as a carrier was introduced at a rate of 36 l./hr. into a vessel containing triethyl aluminum kept at 160° C. and the nitrogen gas saturated with triethyl aluminum kept at 160° C. was fed therefrom to the inner pipe of the above-mentioned two-fluid nozzle through the outlet of the vessel simultaneously with feeding nitrogen as an inert gas to the outer pipe at a rate of 300 l./hr. The feeding rate of triethyl aluminum was determined by weighing the alkyl aluminum vessel and its contents from time to time. In this way the operation was continuously carried out for 500 hours to produce aluminum nitride powder. The apparatus was dismounted to examine the inside thereof and no abnormality was found.

The resulting product was further crystallized in the same manner as the preceding examples by a secondary calcination. The resulting crystal exhibited completely the same X-ray diffraction pattern as aluminum nitride.

COMPARATIVE EXAMPLE 12

Using the same apparatus as in Example 20, the procedure thereof was repeated except that an inert gas was not fed to the outer pipe of the two-fluid nozzle. After 3 hours, the pressure of the triethyl aluminum feeding line began to rise and after 5 hours, feeding of triethyl aluminum became almost impossible. Therefore, the operation had to be stopped and the apparatus was dismounted and examined to find that a grayish white powder-like solid matter was bonded to the portion of the triethyl aluminum feeding nozzle ranging from the opening portion to the inside, thereby clogging the feeding nozzle.

We claim:

1. A process for producing sinterable crystalline aluminum nitride powder by reacting an alkyl aluminum with ammonia in a gas phase at 600°–1300° C. to produce an amorphous aluminum nitride precursor powder followed by calcining the thus-produced precursor powder at 1400° C. or higher to crystallize the precursor powder, wherein
   (A) the precursor powder is produced by a process which comprises:
      (i) employing an empty vertical-column tubular reactor into which the reactants are fed continuously and the reaction product is removed continuously; and
      (ii) feeding into the reactor separate continuous streams of the alkyl aluminum in admixture with an inert gas and of the ammonia to the lower part of the reactor at a molar ratio of the alkyl aluminum to ammonia of from 1/1 to 1/100, and a volume ratio of the alkyl aluminum to the whole gas phase of 0.01–0.2, where they are mixed at about the reaction temperature and where they react, whereby an amorphous aluminum nitride precursor powder is formed within the reactor beyond the point of the introduction of the reactants into the reactor; whereby the likelihood of clogging the reactor with reaction product is reduced; and
   (B) the precursor powder is converted to a sinterable powder by a process which comprises:
      (i) removing a continuous stream of the produced amorphous aluminum nitride precursor powder from the reactor;
      (ii) introducing a continuous stream of the thus-obtained amorphous aluminum nitride precursor powder directly into a first calcining furnace comprising a rotary kiln;
      (iii) calcining continuously the stream of powder in the first calcining furnace at 600°–1300° C. in an atmosphere of a reducing gas containing at least 20% by volume of ammonia;
      (iv) transferring the thus-calcined powder from the first calcining furnace to a second calcining furnace; and
      (v) further calcining the calcined powder in the second calcining furnace at 1400°–1750° C. in a non-reactive atmosphere;

whereby high purity, high density aluminum nitride powder of uniform particle size distribution and low agglomerate content is produced.

2. The process according to claim 1, wherein the reactor is provided with a two-fluid nozzle having an inner pipe surrounded by an outer pipe and the alkyl aluminum and the ammonia gas are introduced into the reactor through the inner pipe and the outer pipe, respectively.

3. The process according to claim 1, wherein the alkyl aluminum is a trialkyl aluminum or a dialkyl aluminum.

4. The process according to claim 3, wherein the alkyl aluminum is selected from the group consisting of trimethyl aluminum, triethyl aluminum, triisopropyl aluminum, triisobutyl aluminum, dimethyl aluminum halide, diethyl aluminum halide, and diisobutyl aluminum halide.

5. The process according to claim 3, wherein the alkyl aluminum is triethyl aluminum.

6. The process of claim 1, wherein the precursor is separated from the gas phase prior to calcining.

7. The process of claim 6, wherein the gas phase contains residual ammonia and a portion thereof is fed to the first calcining furnace.

8. The process of claim 1, wherein the precursor is removed from the reactor and introduced into the first calcining furnace without exposure to air or water.

9. The process of claim 1, wherein the calcined powder is calcined in the first calcining furnace at 900°–1200° C. and in the second calcining furnace at 1500°–1700° C.

10. The process of claim 1, wherein the calcined powder is calcined in the second calcining furnace in a rotary kiln as a closed system.

11. The process of claim 1, wherein the alkyl aluminum is selected from the group consisting of trimethyl aluminum, triethyl aluminum, triisopropyl aluminum, triisobutyl aluminum, dimethyl aluminum halide, diethyl aluminum halide, and diisobutyl aluminum halide; wherein the precursor is separated from the gas phase prior to calcining; wherein the gas phase contains residual ammonia and a portion thereof is fed to the first calcining furnace; wherein the precursor is removed from the reactor and introduced into the first calcining furnace without exposure to air or water; wherein the calcined powder is calcined in the first calcining furnace at 900°–1200° C. and in the second calcining furnace at 1500°–1700° C.; and wherein the calcined powder is calcined in the second calcining furnace in a rotary kiln as a closed system.

12. The process of claim 11, wherein the alkyl aluminum is triethyl aluminum.

* * * * *